(12) United States Patent
Terashima et al.

(10) Patent No.: US 7,177,347 B2
(45) Date of Patent: Feb. 13, 2007

(54) SYNCHRONICITY DETECTION DEVICE

(75) Inventors: Kazuhiko Terashima, Tokyo (JP); Masahiko Naito, Tokyo (JP)

(73) Assignee: Sony Corporation, Tokyo (JP)

( * ) Notice: Subject to any disclaimer, the term of this patent is extended or adjusted under 35 U.S.C. 154(b) by 773 days.

(21) Appl. No.: 09/875,306

(22) Filed: Jun. 5, 2001

(65) Prior Publication Data
US 2002/0021748 A1 Feb. 21, 2002

(30) Foreign Application Priority Data
Jun. 6, 2000 (JP) ............................. 2000-169377

(51) Int. Cl.
*H04B 1/00* (2006.01)

(52) U.S. Cl. ...................... 375/152; 375/150

(58) Field of Classification Search ........ 375/142–143, 375/150, 152, 134, 137, 340, 343, 284
See application file for complete search history.

(56) References Cited

U.S. PATENT DOCUMENTS

| 5,912,919 A | 6/1999 | Lomp et al. | |
| 5,920,591 A * | 7/1999 | Fukasawa et al. | 375/142 |
| 6,075,807 A * | 6/2000 | Warren et al. | 375/143 |
| 6,363,108 B1 * | 3/2002 | Agrawal et al. | 375/152 |
| 6,480,529 B1 * | 11/2002 | Sih et al. | 375/152 |
| 6,504,883 B1 * | 1/2003 | Morimoto et al. | 375/343 |
| 6,636,549 B1 * | 10/2003 | Nakamura et al. | 375/130 |
| 6,668,010 B1 * | 12/2003 | Minematsu | 375/145 |

FOREIGN PATENT DOCUMENTS

EP 0 994 573 4/2000

\* cited by examiner

*Primary Examiner*—Khanh Tran
(74) *Attorney, Agent, or Firm*—Frommer Lawrence & Haug LLP; William S. Frommer

(57) ABSTRACT

To be able to detect a plurality of correlations in a spread code cycle when receiving CDMA type signals spread with a prescribed spread code and performing correlation detections using a matched filters. A synchronicity detection device which detects a timing of a prescribed spread code already known included in a reception signal is equipped with a correlation coefficient generation means 130 which divides and generates a replica code of a spread code of a prescribed length while a phase advances at each interval of a prescribed width and matched filters 103 and 104 which perform detection of correlation values of reception signals and replica codes generated by the correlation coefficient generation means at each interval of a prescribed width.

6 Claims, 11 Drawing Sheets

PRIOR ART

SYNCHRONICITY DETECTION DEVICE

BACKGROUND OF THE INVENTION

1. Field of the Invention

The present invention relates to a synchronicity detection device in a communication terminal device, and specifically relates to a synchronicity detection device applied to and optimal for a cellular wireless communication system using a CDMA (Code Division Multiple Access) technique.

2. Description of the Related Art

The CDMA technique is a multiplexing technique using spread codes, is being investigated for application to cellular wireless communication systems as a wireless access technique for next generation mobile communications, and has already been implemented for some systems. In a cellular wireless communication system, an area in which communication services are provided is divided into cells with a desired size, a base station is installed in each cell as a fixed station, and a communication terminal system which is a mobile station makes a wireless connection with the base station for which the communication conditions are thought to be the most favorable.

FIG. 1 is a drawing indicating an example configuration of such a cellular wireless communication system; multiple base stations B1 to B7 are arranged at prescribed intervals, and cells C1 to C7 are comprised by an arrangement of base stations B1 to B7. A mobile telephone device M1 in the area of cell C1 is connected with the base station B1 through wireless communication.

In such a cellular wireless communication system, the act of searching for a base station for a mobile station to connect to is generally referred to as a cell search. With a CDMA type cellular wireless communication system, each base station uses identical frequencies, so when a cell search is performed, it is necessary pick up the timing of the spread code included in the reception signal.

A synchronicity detection device using a matched filter, for example, is used for processing to pick up a spread code with a CDMA technique. FIG. 2 is a configuration diagram indicating one example of a synchronicity detection device using conventional match filters. A reception signal obtained at an input terminal 901 is supplied to mixers 902 and 903, and after a carrier wave outputted by a carrier wave generator 904 is mixed in the reception output with the mixer 902 and a carrier wave outputted by the carrier wave generator 904 is phase shifted by É$\times$/2 with a É$\times$/2 phase converter 905, the mixing in the reception output occurs at the mixer 905, and detection is made of the orthogonal component and in-phase component included in the reception signal.

The detected in-phase component and orthogonal component are supplied to analog/digital converters 906 and 907, the digitally converted orthogonal component Dq and the in-phase component Di are obtained, and the data Di and Dq are provided to matched filters 910 and 911 respectively via band pass filters 908 and 909 respectively.

Matched filters 910 and 911 are circuits for detecting correlations with reception data of the CDMA technique spread with the prescribed spread code; spread code replicas Ci and Cq of the orthogonal component and in-phase component provided by a correlation coefficient generator 912 are supplied to the matched filters 910 and 911 respectively. Next, a correlation value $\Sigma^m$ DiCi of the reception data Di and the replica code Ci, and the correlation value $\Sigma^m$ DiCq of the reception data Di and the replica code Cq are obtained with the matched filter 910. A correlation value $\Sigma^m$ DqCi of the reception data Dq and the replica code Ci and a correlation value $\Sigma^m$ DqCq of the reception data Dq and the replica code Cq are obtained with the matched filter 911.

The correlation value $\Sigma^m$ DiCi outputted by the matched filter 910 and the correlation value $\Sigma^m$ DqCq outputted by the matched filter 911 are supplied to an adder 914, and a sum value of both correlation values ($\Sigma^m$ DiCi+$\Sigma^m$ DqCq) is obtained. The sum value is an inverse spread output of the in-phase component. The inverse spread output is supplied to a squaring circuit 916 where it is made into a real number and supplied to an adder 918.

The correlation value $\Sigma^m$ DiCq outputted by the matched filter 910 and the correlation value $\Sigma^m$ DqCi outputted by the matched filter 911 are supplied to an subtracter 915, and a value of the difference of both correlation values ($\Sigma^m$ DqCi−$\Sigma^m$ DiCq) is obtained. This difference value is the inverse spread output of the orthogonal component. The inverse spread output is supplied to a squaring circuit 917 where it is made into a real number and supplied to the adder 918.

At the adder 918, both supplied signals are added and a correlation energy E is found as a single system signal. The configuration of the matched filter is described in detail in the Embodiments mentioned below; the reception data is set to a shift register with a prescribed number of levels, the replica code which is anticipated to be included in the reception data and the reception data set to the shift register are multiplied, and if the reception data matches the spread code and the replica code, the local maximum value is obtained as the correlation output. Accordingly, if the code in which the reception data is being diffused matches the replica code, the final outputted correlation energy E indicates the maximum value, and timing to inversely spread the data can be obtained from the timing which indicates that maximum value.

FIG. 3 is a drawing indicating an example of a state of correlation detection with the synchronicity detection device indicated in FIG. 2. In this example, when the number of levels of the shift register equipped in a matched filter in the detection device is m, the correlation addition chip number becomes m, and the searchable range becomes m x n chips. The state of the shift register in the matched filter proceeds one chip at a time as indicated in FIG. 11A, and the m-bit correlation coefficient (in other words, the output of the correlation coefficient generator) inputted to the matched filter is always the same data as indicated in FIG. 3B.

Accordingly, the output of the matched filter (FIG. 3C) changes one chip at a time within the searchable range. Then, the correlation energy which is that output is written to an address with a different memory one chip at a time as indicated in FIG. 3D, so that the value written to the memory changes one chip at a time as indicated in FIG. 3E. When a value MFD(t) set to the matched filter with some timing and an output MFC(t) of the correlation coefficient generator match, an output OUT(t) of the matched filter is the maximum value in the searchable range, and the timing is detected as the standard timing. The timing of the maximum value exists only once in a spread code cycle.

For the synchronicity detection device using the matched filter mentioned above, only a correlation output for which the number of chips equivalent to the number of levels of the shift register of the matched filter is summed can be found. To obtain the timing of a spread code using pseudonoise with a long cycle, the correlation energy is detected using only a part of the spread code, but the local maximum value of the correlation energy can only be obtained once per spread code cycle.

With a CDMA type receiver, a synchronicity detection device using a sliding correlator is sometimes used. With such a synchronicity detection device using a sliding correlator, it is possible to obtain a correlation detection in which a larger number of chips is added with a small circuit scale compared to that when using a matched filter. However, with regard to the time required to find the correlation output for the timing of one spread code, the sliding correlator takes an M-chip quantity of time when the number of chips added to find the correlation is made M compared to a spread code one-chip interval of time for a matched filter. Because of this, in order to find and compare the correlation output compared to a temporally wide range of timings, a sliding correlator is not favorable as it takes too much time.

SUMMARY OF THE INVENTION

The object of the present invention is to make it possible to detect a plurality of correlations within one cycle of a spread code when performing correlation detection using a matched filter.

The synchronicity detection device according to the present invention for detecting the timing of a spread code of a known prescribed length contained in a reception signal comprises correlation coefficient generating means for generating a replica code of a prescribed length by advancing and dividing the phase thereof at every interval of time and a matched filter for detecting a correlation value between the replica code generated by the correlation coefficient generating means and the reception signal at every interval of time.

By doing such, detection of a correlation value between a replica code and a reception signal at each prescribed interval of time during one cycle of a spread code can be made, and it is possible to detect correlations within one cycle of a spread code a plurality of times.

DESCRIPTION OF THE PREFERRED EMBODIMENTS

A first embodiment of the invention is described below by referring to FIG. 4 to FIG. 10.

The present embodiment is applied to a synchronicity detection device for receiving data wirelessly transmitted from a base station. A CDMA system in which data is diffused and transmitted by a prescribed spread code is applied to the wireless transmission system for performing wireless transmission between the base station and the reception terminal apparatus. The synchronicity detection device within the reception terminal apparatus detects the timing of this spread code. In the case of the present embodiment, the spread codes which diffuse data transmitted to each base station differ, and the spread code of the data already outputted from the transmission station (base station) is known at the synchronicity detection device of the present embodiment. To a certain extent, the phase range of the spread code (in other words, the range in which synchronicity timing exists) is estimated in a separate process. In the synchronicity detection device of the present embodiment, processing is performed to detect a more accurate synchronicity timing from the synchronicity timing estimated within a range of a certain extent.

Figure 4:
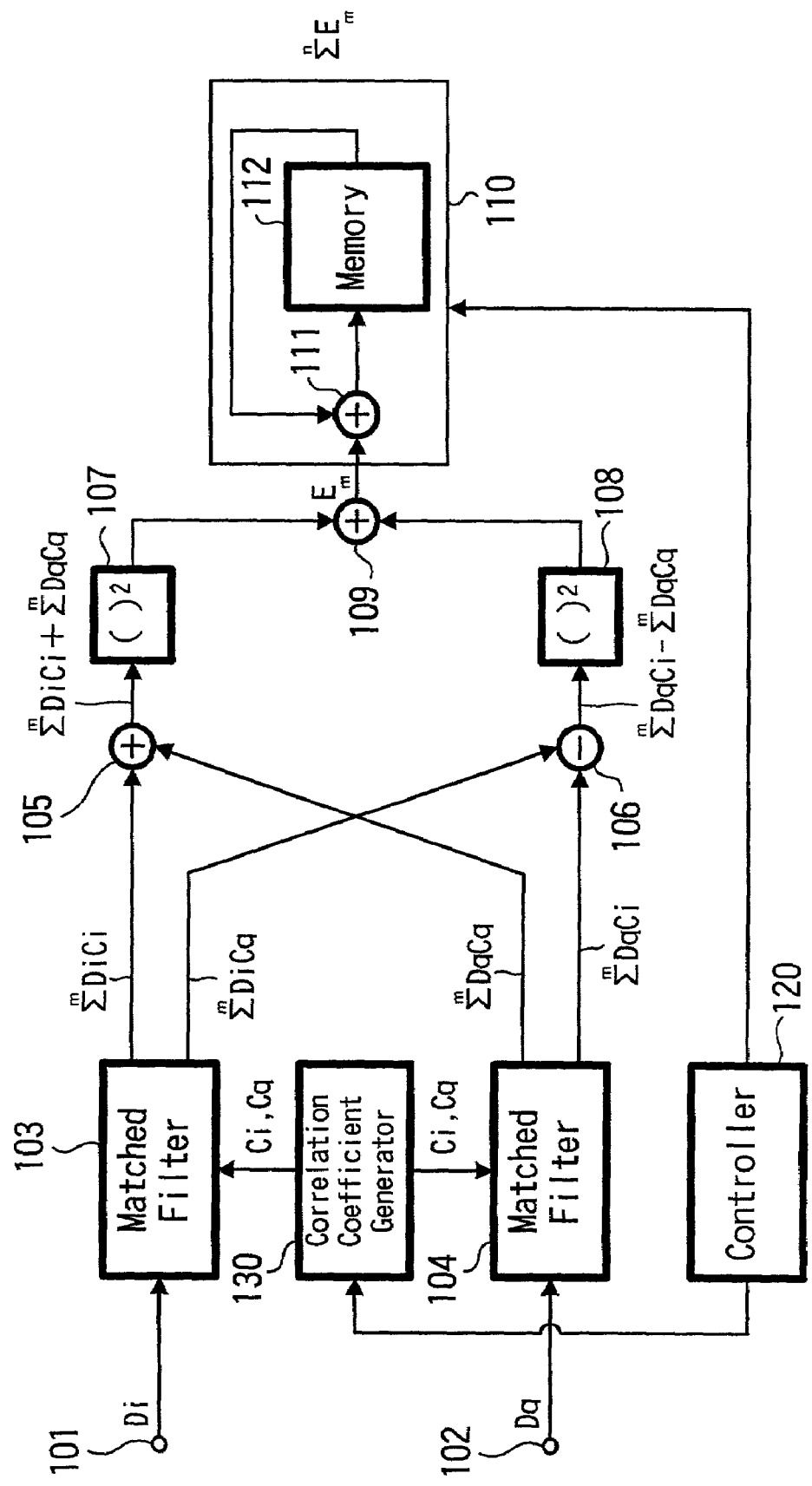
FIG. 4 is a block diagram indicating a configuration example of a synchronicity detection device according to a first embodiment of the present invention.

FIG. 4 is a drawing indicating a configuration of a synchronicity detection device of the present embodiment. At an input terminal 101, data Di on a digitized in-phase component after detecting reception signals of a prescribed channel (frequency) is obtained, and at an input terminal 102, data Dq on an orthogonal component of the same channel is obtained. The data Di and Dq are supplied to matched filters 103 and 104.

The matched filters 103 and 104 are circuits to detect correlations with CDMA type reception data diffused by a prescribed spread code and supply replicas Ci and Cq of spread codes of an in-phase component and orthogonal component supplied by a correlation coefficient generator 130 respectively to the matched filters 103 and 104. The cycle T of the matched filters 103 and 104 of the present embodiment is larger than the number of levels m of a shift register equipped with matched filters 103 and 104 where the spread code cycle is T. In concrete terms, for example, the cycle T is set to 38,400 chips and the number of levels m of the shift register is set to 256.

The replicas Ci and Cq generated at and supplied from the correlation coefficient generator 130 are caused to change in sequence with the advance in the m-chip phase each time the clock generates m times (in other words, each time m chips are advanced). The detailed processing therefor is described below. In the description below, when one cycle is mentioned, this indicates one cycle of a spread code, and the time interval for the clock to be generated m times within the interval of one cycle is referred to as a unit interval of time.

A correlation value $\Sigma^m$ DiCi between the reception data Di and the replica code Ci, and a correlation value m DiCq between the reception data Di and the replica code Cq are obtained at the matched filter 103. Also, a correlation value $\Sigma^m$ DqCi between the reception data Dq and the replica code Ci, and a correlation value $\Sigma^m$ DqCq between the reception data Dq and the replica code Cq are obtained at the matched filter 104.

The correlation value $\Sigma^m$ DiCi outputted by the matched filter 103 and the correlation value $\Sigma^m$ DqCq outputted by the matched filter 104 are supplied to an adder 105, and a sum value of both correlation values ($\Sigma^m$ DiCi+$\Sigma^m$ DqCq) is obtained. This sum value becomes an inverse diffusion output of the in-phase component. This inverse diffusion output is supplied to a squaring circuit 107, made into a real number, and is supplied to an adder 109.

The correlation value $\Sigma^m$ DiCq outputted by the matched filter 103 and the correlation value $\Sigma^m$ DqCi outputted by the matched filter 104 are supplied to a subtracter 106, and a difference value of both correlation values ($\Sigma^m$ DqCi−$\Sigma^m$ DiCq) is obtained. This difference value becomes an inverse spread output of the orthogonal component. This inverse spread output is supplied to a squaring circuit 108, made into a real number, and is supplied to an adder 109.

At the adder 109, both supplied signals are added, making them into a single system signal, and a correlation energy $E_m$ can be obtained. The correlation energy $E_m$ outputted by the adder 109 is supplied to a cycle adding part 110. The cycle adding part 110 is a circuit configured with an adder 111 and a memory 112; correlation energy $E_m$ data supplied by the adder 109 is supplied to the adder 111, is added to an output of the memory 112 at the adder 111, and the sum output is written to the memory 112. When a time interval elapses in which a clock generates m times, the written data is read out and supplied to the adder 111, and in effect, the memory 112 functions as a circuit in which the periods where the clock generates m times are added cumulatively as one cycle.

Each address value cumulatively added to the memory 112 is read and judged by a controller 120 which controls synchronicity detection operations of the synchronicity detection device. The phase which causes a spread code replica to be generated at the correlation coefficient generator 130 is controlled by the controller 120.

Figure 5:
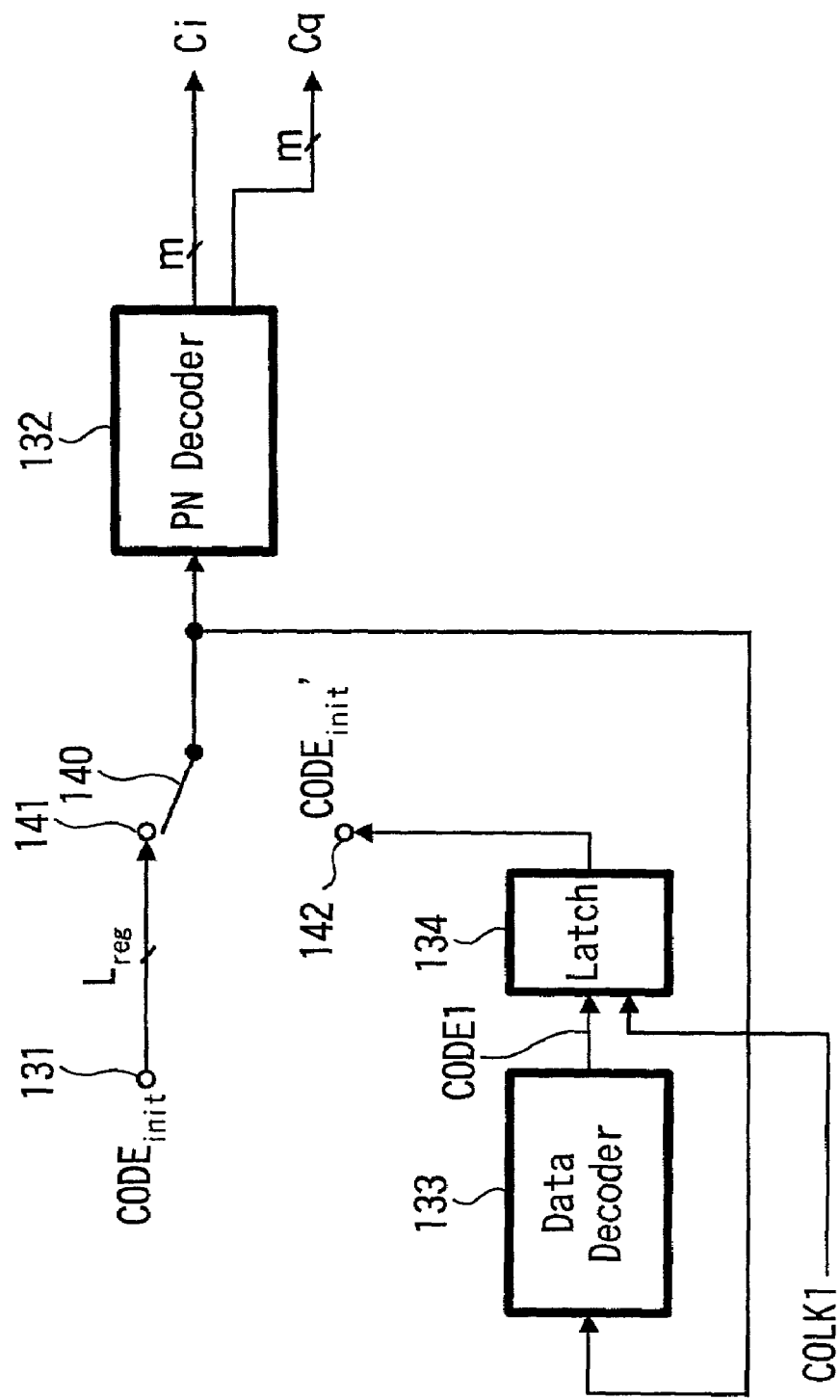
FIG. 5 is a block diagram indicating a configuration example of a correlation coefficient generator according to the first embodiment of the present invention.

FIG. 5 is a drawing indicating an example configuration of the correlation coefficient generator 130 of the present embodiment. An initial value $CDED_{init}$ for causing a spread code replica to be generated is obtained at an input terminal 131; this initial value $CDED_{init}$ is supplied to a first fixed contact point 141 of a switching switch 140. The initial value $CDED_{init}$ is a code with a length of $L_{reg}$ bits (here, 9 bits) for causing the generation of an initial one-unit value of a spread code set for each receiving base station; this is set, for example, by controller 120.

In the initial unit interval of time of each cycle of the spread code, the switching switch 140 is in a connection state with a first fixed contact point 141; the initial value obtained at the input terminal 131 is provided to a data decoder 133 and a PN decoder 132 via the switching switch 140. The PN decoder 132 is a decoder to generate a pseudo-noise (PN) code which is a pseudo-random series based on the supplied data. Here, two-system PN codes of an in-phase component PN code and an orthogonal component PN code are generated, and the PN codes are supplied to the aforementioned two matched filters 103 and 104 respectively as spread code replicas.

The data decoder 133 generates a value CDED1 for generating the next one-unit PN code based on the initial value supplied via the switching switch 140 and latches that generated value to a latch circuit 134. A clock CLK1 is supplied and a latch operation is performed at the latch circuit 134. The latch operation of the supplied data is repeated each time, for example, the clock CLK1 is supplied a prescribed number of times (here, m times). The value held in the latch circuit 134 is supplied to a second fixed contact point 142 of the switching switch 140. In the interval other than the initial one-unit interval of each spread code cycle, the switching switch 140 is in a state of being connected with the second fixed contact point 142; the data latched to the latch circuit 134 is supplied to the PN decoder 132 via the switching switch 140, the next unit of PN code generates, a return is made to the decoder 133, and an initial value $CDED_{init}'$ for generating the next unit of PN code generates.

At the correlation efficient generator 130 of the present embodiment, when one cycle of the spread code elapses, the switching switch 140 is returned to the first fixed contact point 141 side, and processing to input the initial value, $CDED_{init}$, again is repeated. The spread code replica generation timing of the correlation coefficient generator 130 is set by the controller 120 which controls the detection synchronization of the synchronicity detection device.

Figure 1:
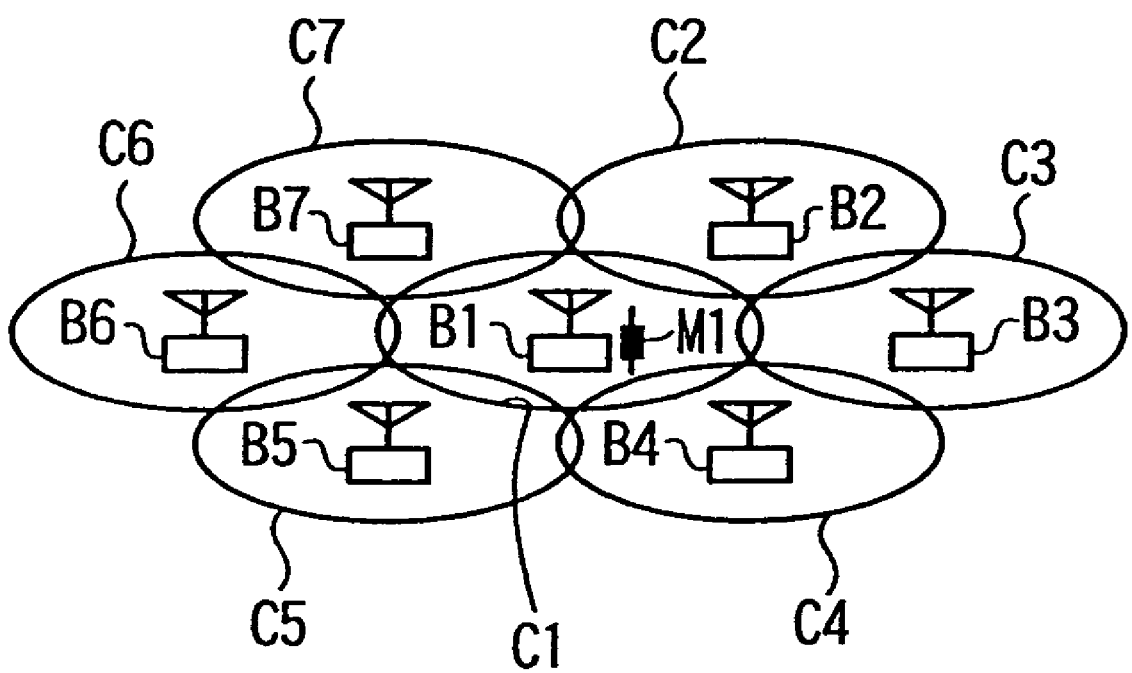
FIG. 1 is a descriptive diagram indicating a configuration example of a cellular wireless communication system.
Figure 2:
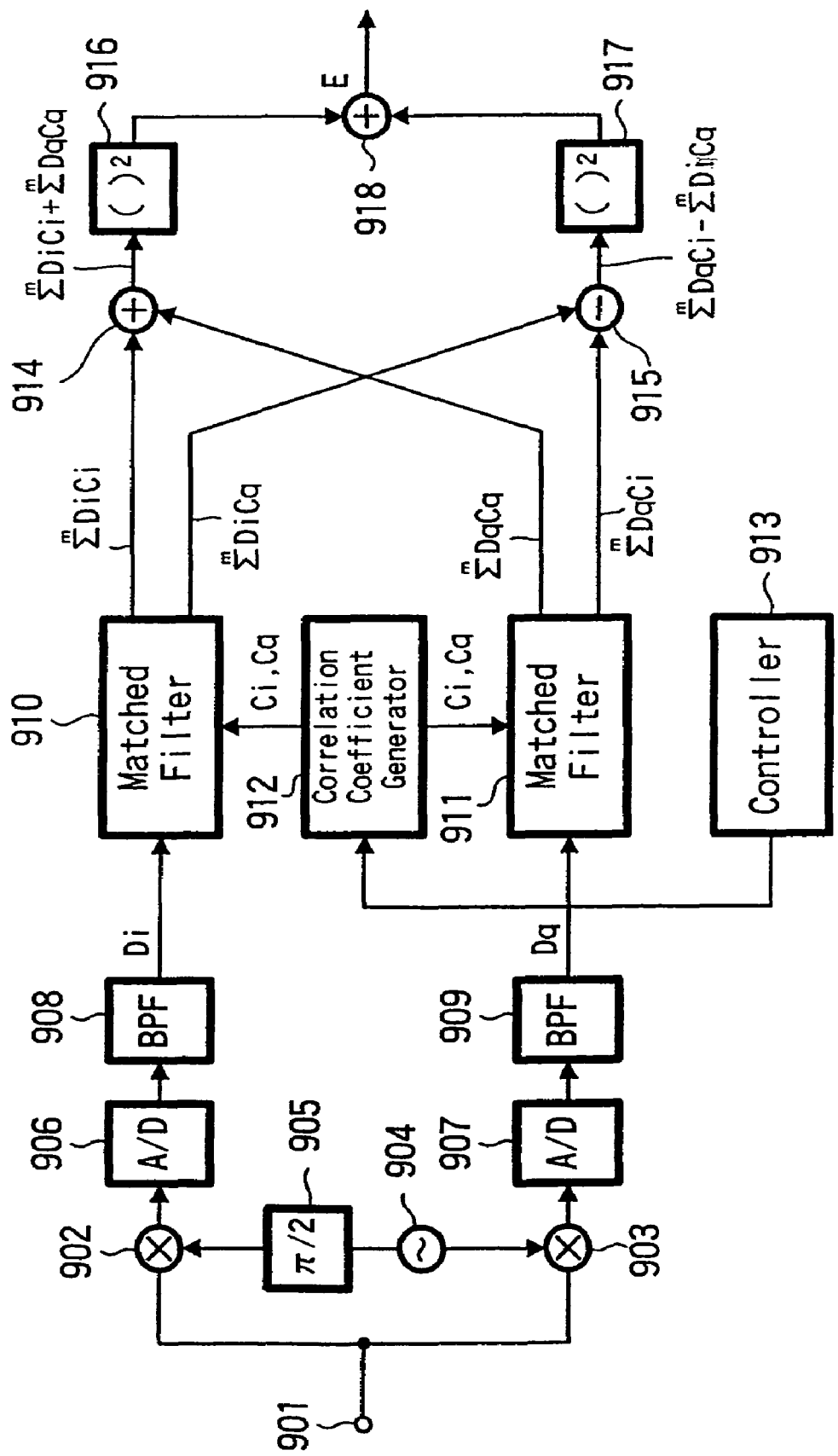
FIG. 2 is a block diagram indicating a configuration example of a conventional synchronicity detection device.
Figure 3:
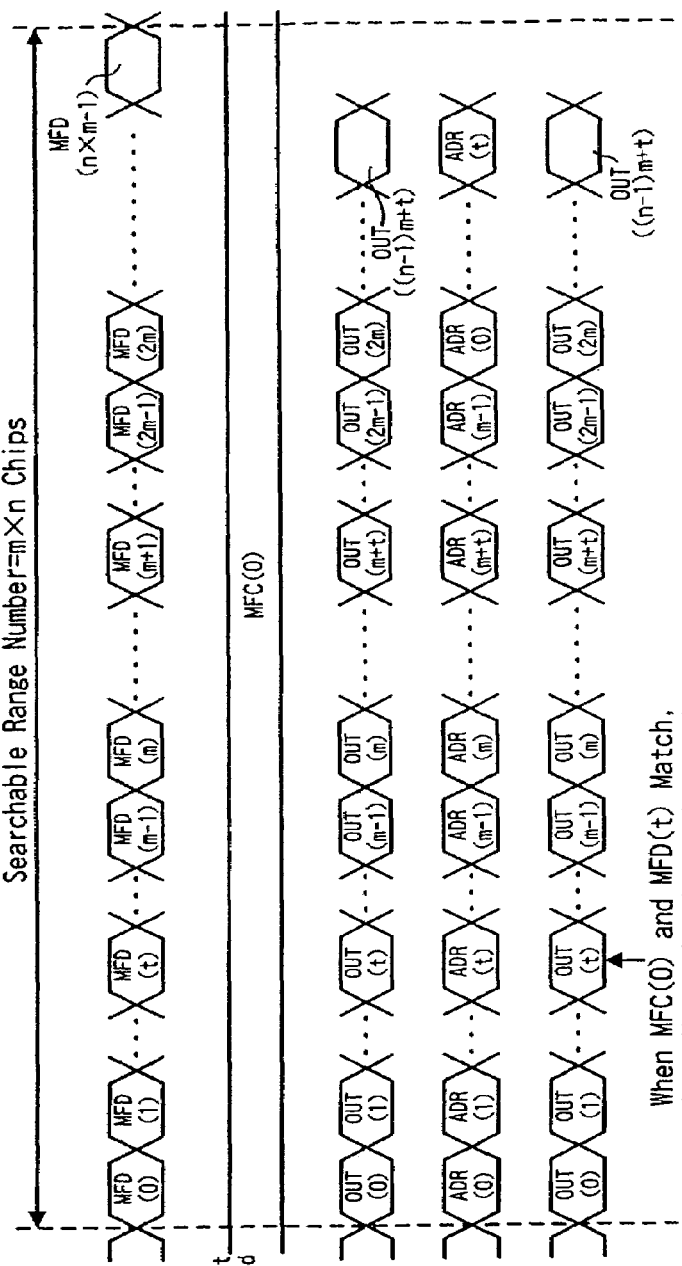
FIG. 3 is a timing diagram indicating an operation example according to the configuration in FIG. 2.

The configuration of the PN decoder 132 is next described. FIG. 3 indicates a general configuration example (not the configuration of the PN decoder 132 in the present embodiment) of a PN decoder. Referring to the PN decoder indicated in FIG. 6 and explaining the principle whereby a PN code generates, in this embodiment, the PN decoder is configured with 9 levels of shift registers D0 to D8 and an Ex-OR (exclusive-or) gate circuit 132A; an output of the shift register D0 is outputted as a PN code, an exclusive-or operation is performed with the output of the shift register D0 and the output of the shift register D4, and the result is returned to the shift register D8.

When the initial values set to the shift registers D0 to D8 are set to data I0 to I8, an output O0 at timing t=0 is the data I0. When the data I0 is outputted, the data inputted to the shift register D8 is the result of an exclusive-or of the data I0 and the data I4. An output O1 at timing t=1 is the data I1; the data inputted to the shift register D8 at that time is the result of an exclusive-or of the data I1 and the data I5. Below, the values set to the shift registers in sequence are shifted in sequence and outputted, and exclusive-or operations are repeated with the output of the shift register D0 and the output of the shift register D4.

Figure 7:
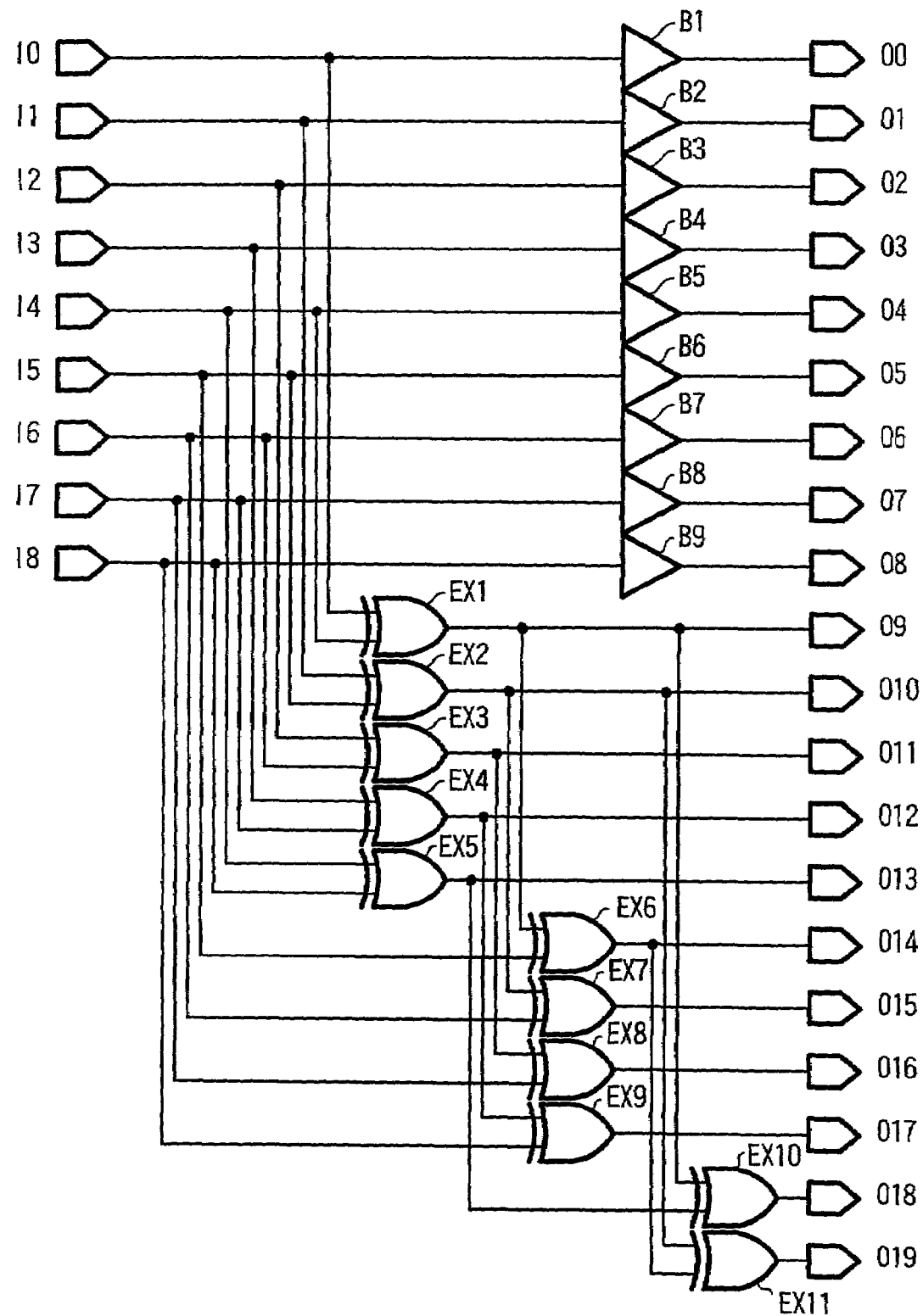
FIG. 7 is a block diagram indicating a configuration example of a PN decoder.

From this, the output codes O0 to O19 from time t=0 to t=19, for example, can be expressed using an exclusive-or operation with the initial values I0 to I8 as references. The PN decoder 132 in the present embodiment is configured taking this into consideration. FIG. 7 is a diagram indicating the principle of the configuration of the PN decoder 132 of the present embodiment; the configuration is such that when the 9-bit initial values I0 to I8 are inputted in parallel, the 9-bit data is developed with logical operations, and 20-bit PN codes O0 to O19 are generated all at once.

At the PN decoder of the present embodiment indicated in FIG. 7, the input data I0 to I8 is outputted via buffers B1 to B9 respectively, becoming output data O0 to O8. Two pieces of input data become output data O9 to O13 through an exclusive-or operation at Ex-OR gate circuits EX1 to EX5. The input data and the output of Ex-OR gate circuits EX1 to EX4 become output data O14 to O17 through an exclusive-or operation at Ex-OR gate circuits EX6 to EX9. The output of the Ex-OR gate circuit EX1 and the output of the Ex-OR gate circuit EX5 become output data O18 through an exclusive-or operation at an Ex-OR gate circuit EX10; the output of the Ex-OR gate circuit EX2 and the output of the Ex-OR gate circuit EX6 become output data O19 through an exclusive-or operation at an Ex-OR gate circuit EX11. The buffers B1 to B9 are for correcting a timing delay due to the operations at the Ex-OR gate circuits.

When a 9-bit initial value $CDED_{init}$ is supplied from the terminal 131 indicated in FIG. 5 to a PN decoder with a configuration indicated in FIG. 7, a spread code which is a 19-bit PN code generates. The configuration of an actual PN decoder 132 is such that an m-bit spread code (replica code) MFC corresponding to level m of the shift register equipped with the matched filters 103 and 104 generates all at once. For example, if the number of levels m of the shift register is 256, a 256-bit spread code generates all at once at the PN decoder 132 by inputting several-bit initial value, and correlation detection processing is prosecuted at the matched filters 103 and 104 in a unit interval of time with the 256-bit spread code (replica code).

The replica code MFC is a partial code of the spread code. It is desirable that a partial code of a desired phase of the spread code (here, a phase is a desired unit within one cycle) can be generated when detecting the correlation with the spread code. When considering the code generation principle of the PN decoder, the output code is decided by the value in the shift register. Accordingly, the value in the shift register is calculated at the prescribed time, and if this is inputted in the PN decoder, it is possible to easily generate a partial code of the desired phase. Calculating the value in the shift register at the prescribed time is the role of the data decoder 133.

Next, the principle of the data operation at the data decoder 133 is described. In general, a value in the shift register at a prescribed time t=X can be found with an exclusive-or operation with a matrix according to the initial value of the shift register and the shift quantity of the shift register. For example, when the generation code is PN 95, the values I8' to I0' in the shift register at t=9 are expressed as in the formula:

[Mathematics 1]

$$\begin{pmatrix} I0' \\ I1' \\ I2' \\ I3' \\ I4' \\ I5' \\ I6' \\ I7' \\ I8' \end{pmatrix} = \begin{pmatrix} I0 \oplus I4 \\ I1 \oplus I5 \\ I2 \oplus I6 \\ I3 \oplus I7 \\ I4 \oplus I8 \\ I0 \oplus I4 \oplus I5 \\ I1 \oplus I5 \oplus I6 \\ I2 \oplus I6 \oplus I7 \\ I3 \oplus I7 \oplus I8 \end{pmatrix} = \begin{pmatrix} 1 & 0 & 0 & 0 & 1 & 0 & 0 & 0 & 0 \\ 0 & 1 & 0 & 0 & 0 & 1 & 0 & 0 & 0 \\ 0 & 0 & 1 & 0 & 0 & 0 & 1 & 0 & 0 \\ 0 & 0 & 0 & 1 & 0 & 0 & 0 & 1 & 0 \\ 0 & 0 & 0 & 0 & 1 & 0 & 0 & 0 & 1 \\ 1 & 0 & 0 & 0 & 1 & 1 & 0 & 0 & 0 \\ 0 & 1 & 0 & 0 & 0 & 1 & 1 & 0 & 0 \\ 0 & 0 & 1 & 0 & 0 & 0 & 1 & 1 & 0 \\ 0 & 0 & 0 & 1 & 0 & 0 & 0 & 1 & 1 \end{pmatrix} \oplus \begin{pmatrix} I0 \\ I1 \\ I2 \\ I3 \\ I4 \\ I5 \\ I6 \\ I7 \\ I8 \end{pmatrix} \quad (1)$$

When this transformation matrix is set to A as in the following formula,

[Mathematics 2]

$$A = \begin{bmatrix} 1 & 0 & 0 & 0 & 1 & 0 & 0 & 0 & 0 \\ 0 & 1 & 0 & 0 & 0 & 1 & 0 & 0 & 0 \\ 0 & 0 & 1 & 0 & 0 & 0 & 1 & 0 & 0 \\ 0 & 0 & 0 & 1 & 0 & 0 & 0 & 1 & 0 \\ 0 & 0 & 0 & 0 & 1 & 0 & 0 & 0 & 1 \\ 1 & 0 & 0 & 0 & 1 & 1 & 0 & 0 & 0 \\ 0 & 1 & 0 & 0 & 0 & 1 & 1 & 0 & 0 \\ 0 & 0 & 1 & 0 & 0 & 0 & 1 & 1 & 0 \\ 0 & 0 & 0 & 1 & 0 & 0 & 0 & 1 & 1 \end{bmatrix} \quad (2)$$

the transformation matrix A finds the value in the shift register just when time "9" has elapsed after the reference time. Accordingly, when finding the values I8" to I0" in the shift register when time t=18, as shown in the following formula,

[Mathematics 3]

$$\begin{bmatrix} I0'' \\ I1'' \\ I2'' \\ I3'' \\ I4'' \\ I5'' \\ I6'' \\ I7'' \\ I8'' \end{bmatrix} = \begin{bmatrix} I0 \oplus I8 \\ I0 \oplus I1 \oplus I4 \\ I1 \oplus I2 \oplus I5 \\ I2 \oplus I3 \oplus I6 \\ I3 \oplus I4 \oplus I7 \\ I4 \oplus I5 \oplus I8 \\ I0 \oplus I4 \oplus I5 \oplus I6 \\ I1 \oplus I5 \oplus I6 \oplus I7 \\ I2 \oplus I6 \oplus I7 \oplus I8 \end{bmatrix} \quad (3)$$

$$= \begin{bmatrix} 1 & 0 & 0 & 0 & 1 & 0 & 0 & 0 & 0 \\ 0 & 1 & 0 & 0 & 0 & 1 & 0 & 0 & 0 \\ 0 & 0 & 1 & 0 & 0 & 0 & 1 & 0 & 0 \\ 0 & 0 & 0 & 1 & 0 & 0 & 0 & 1 & 0 \\ 0 & 0 & 0 & 0 & 1 & 0 & 0 & 0 & 1 \\ 1 & 0 & 0 & 0 & 1 & 1 & 0 & 0 & 0 \\ 0 & 1 & 0 & 0 & 0 & 1 & 1 & 0 & 0 \\ 0 & 0 & 1 & 0 & 0 & 0 & 1 & 1 & 0 \\ 0 & 0 & 0 & 1 & 0 & 0 & 0 & 1 & 1 \end{bmatrix} \oplus \begin{bmatrix} I0 \oplus I4 \\ I1 \oplus I5 \\ I2 \oplus I6 \\ I3 \oplus I7 \\ I4 \oplus I8 \\ I0 \oplus I4 \oplus I5 \\ I1 \oplus I5 \oplus I6 \\ I2 \oplus I6 \oplus I7 \\ I3 \oplus I7 \oplus I8 \end{bmatrix}$$

$$= A \oplus \begin{bmatrix} I0' \\ I1' \\ I2' \\ I3' \\ I4' \\ I5' \\ I6' \\ I7' \\ I8' \end{bmatrix}$$

they can be found through calculation using the transformation matrix A with the values I8' to I0' in the shift register as the initial values when t=9.

Figure 8:
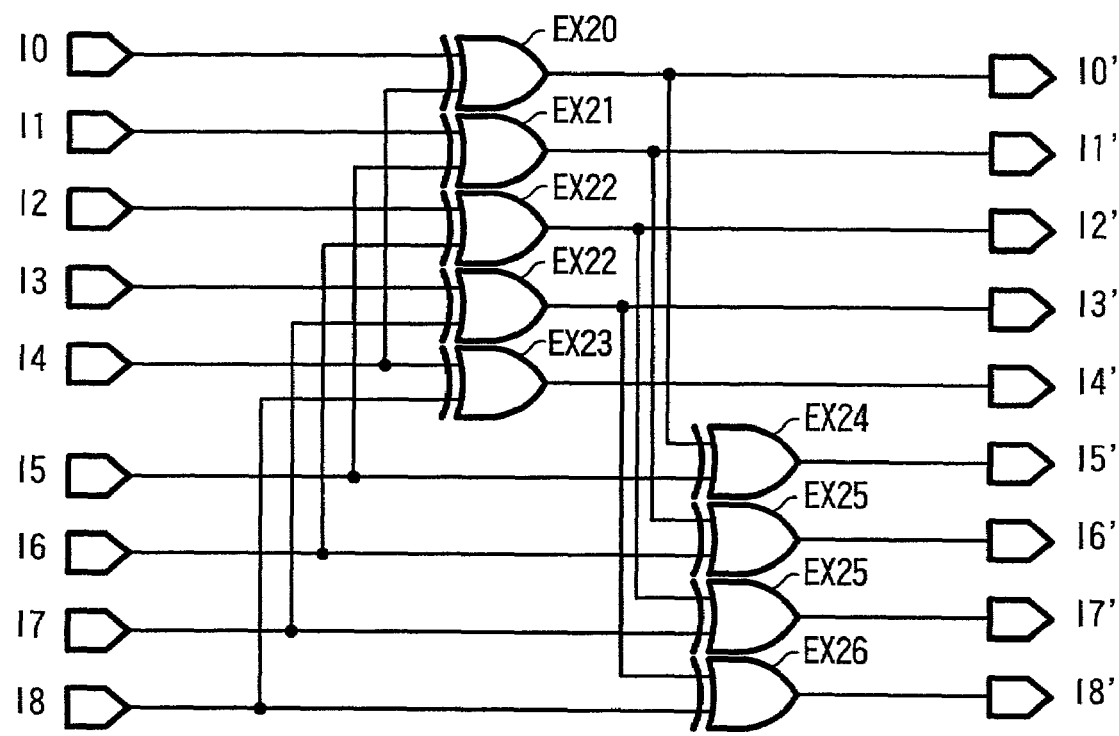
FIG. 8 is a block diagram indicating a configuration example of a PN decoder.

Accordingly, it is fine if the data decoder performs an exclusive-or operation corresponding to the transformation matrix, and the data decoder 105 which is to find the value in the shift register when the time "9" has just elapsed can be configured with only the Ex-OR gate circuits EX20 to EX26 as indicated in FIG. 8.

The data decoder 133 mentioned above is configured with only the Ex-OR gate circuits based on this principle, and the next phase (unit) PN code initial value can be generated by performing an exclusive-or operation with the initial value CDED$_{init}$ at some time as the input. By providing such a decoder 133 which is configured such that the following unit initial values are generated one after another, a spread code whose phase is shifted by m bits each unit is outputted by the correlation efficient generator 130 by generating a PN code at the correlation efficient generator 130.

Figure 9:
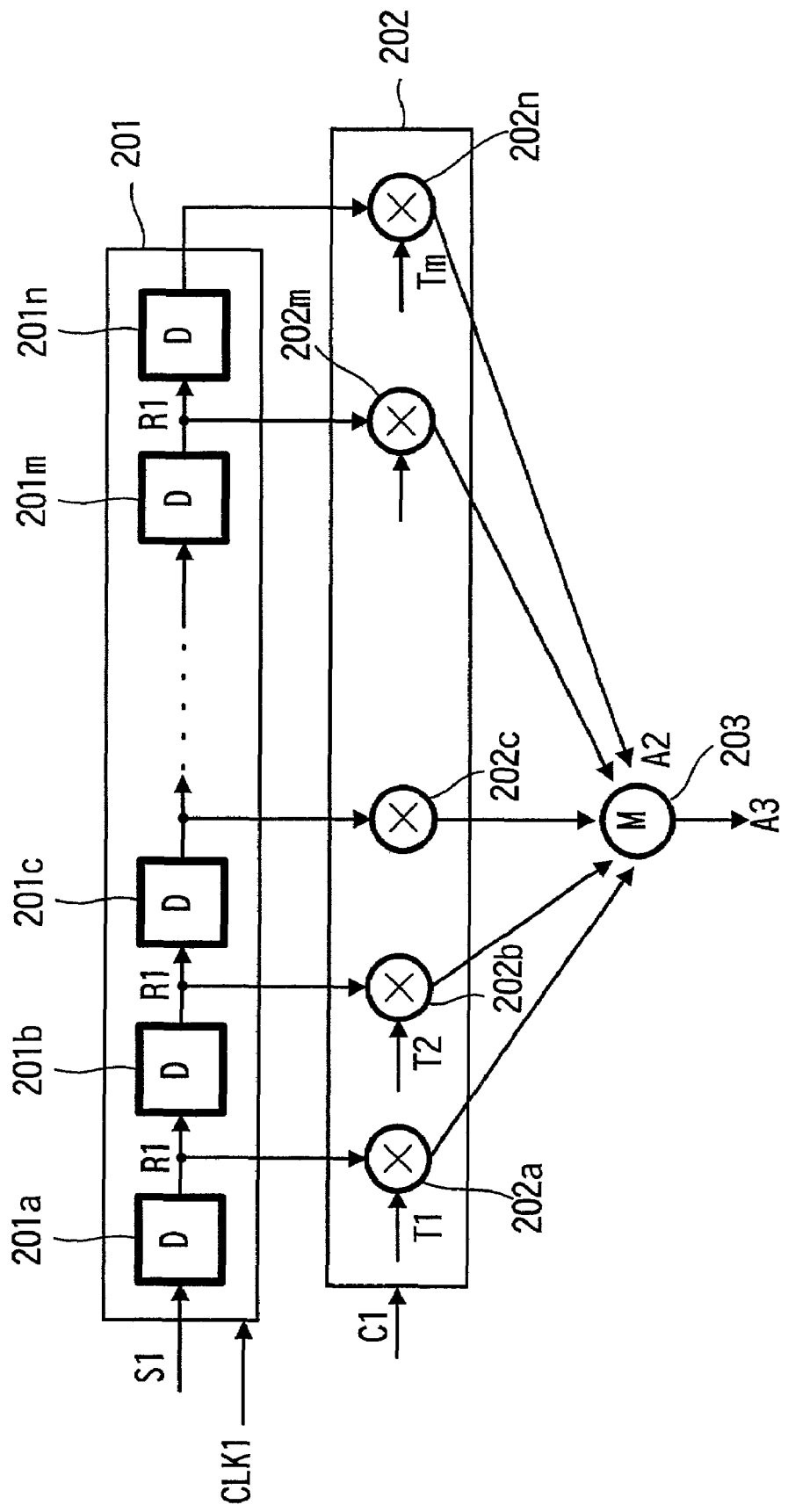
FIG. 9 is a block diagram indicating a configuration example of a matched filter.

FIG. 9 indicates a configuration of the matched filters 103 and 104 which detect a correlation between the reception data and the spread code thus generated with the correlation efficient generator.

In the matched filter indicated in FIG. 9, with the reception data as Si, the clock as CLK1, and the spread code supplied by the correlation efficient generator 130 as C1, the reception data S1 is supplied to a shift register 201 with a prescribed number of levels, synchronized to the CLK1, and set to the levels of registers 201a to 201n in sequence one bit at a time. The number of levels of the shift register 201 is m levels for the present embodiment.

Figure 6:
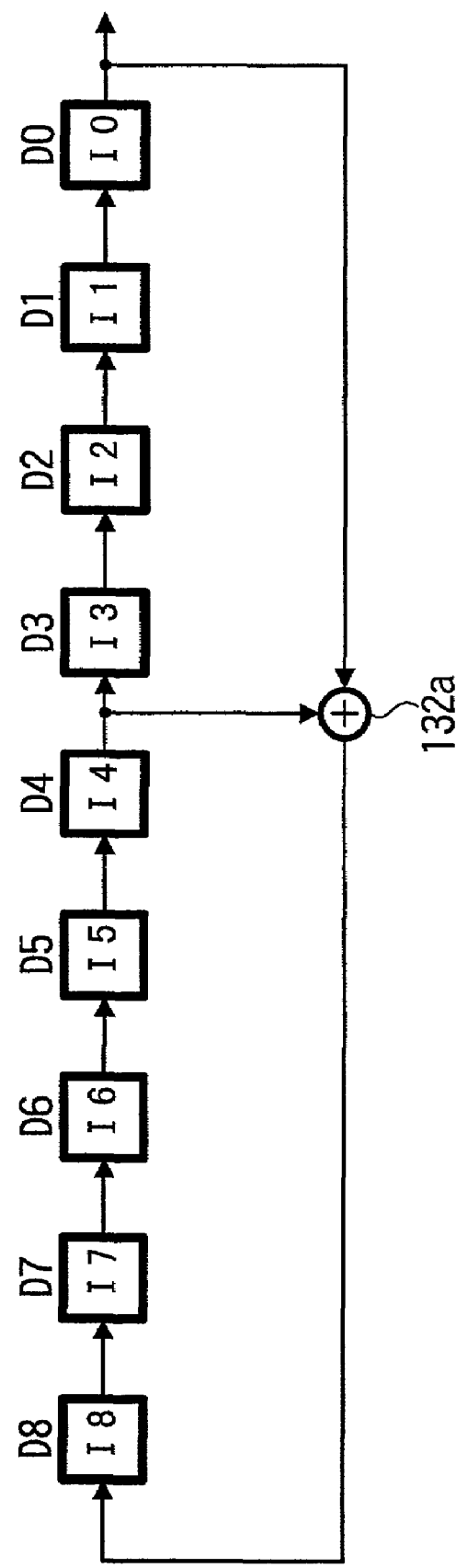
FIG. 6 is a block diagram indicating a configuration example of a PN decoder.

The data set to each level of registers 201a to 201n is supplied to a detection multiplier 202, and the coefficient values set to the individual multipliers 202a to 202n for each bit are multiplied. The coefficient values set to the multipliers 202a to 202n are spread code values with m bits. In concrete terms, with the first bit of an m-bit spread code C1 as T1, the second bit as T2 . . . and the mth bit as Tm, each bit value is set as a coefficient value to multipliers 202a to 202n as indicated in FIG. 6 and multiplied with the m-bit reception data, and the total of those results is found with an adder 203 and outputted. The output of that total is an output of the matched filter. The coefficient values set to each multiplier 202a to 202n change to coefficient values due to the next unit spread code each time the reception date undergoes an m-bit change.

Figure 10:
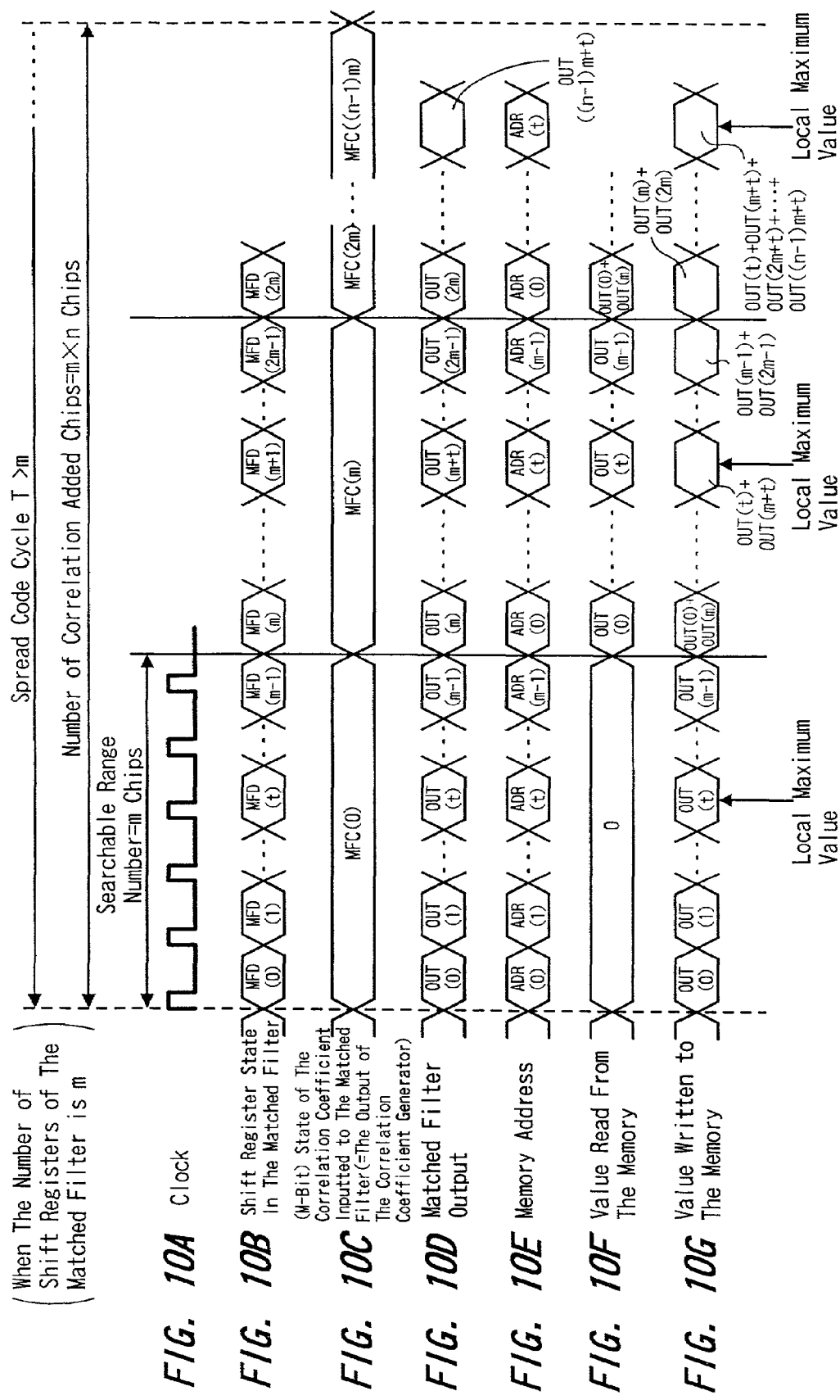
FIG. 10 is a timing diagram indicating an operation example according to the first embodiment of the present invention.

FIG. 10 is a drawing indicating an embodiment of a state where correlation detection is performed with a synchronicity detection device of the present embodiment. In this embodiment, the number of levels of a shift register equipped with matched filters in the detection device is m, and the searchable range per time (one unit) is m chips. The state of the shift registers in the matched filter is synchronized to the clock indicated in FIG. 10A, and proceeds one chip at a time as indicated in FIG. 10B. The m-bit correlation coefficient (in other words, the output of the correlation coefficient generator: the spread code replica code) inputted in the matched filter is updated by a value whose phase advances by m chips each time the searchable range of m chips per time (one unit) advances.

In this manner, correlation detection is performed with each matched filter, and in the initial m-chip search range, the output of the matched filter indicated in FIG. 10D (actually, the output of the adder 109 indicated in FIG. 4) is written to the memory address 112 indicated in FIG. 10E. In the initial unit interval of time, the value read from the memory 112 is 0 as indicated in FIG. 10F; the value added to the output of the matched filter at the adder 111 is 0. Accordingly, the output of the adder 109 in FIG. 10D is written to the memory 112 as is as indicated in FIG. 10G.

In the initial unit m-chip search interval, when, for example, a timing, in other words, with an initial timing at 0 chips, at a time of t chips, the correlation energy as the matched filter output is a maximum value.

Then, when it is the interval for the next unit m-chip search, the m-bit correlation coefficient (replica code) inputted to the matched filter is updated to a value MFC (m) whose phase advances by m chips from the initial value MFC (0) as indicated in FIG. 10C, and the updated value and the value set to the shift register are compared in the matched filter.

At this time, the value written in the unit interval of time immediately before is stored in the memory 112, and when the correlation value of each chip is written, the value written m chips before is read out from the memory 112, that read value is added to the correlation value by the adder 111 and written to the memory 112 as indicated in FIG. 7G. Accordingly, according to a synchronicity detection device of the present embodiment, the correlation values detected in an m-chip cycle are cumulatively added, and if there is no disorder in the correlation detection state, the maximum value of the correlation in each unit search range has the same detected timing; for example, in the example in FIG. 10, the detection of maximum values continues at m chip cycles from the time of t chip. When one cycle (or a prescribed plurality of cycles) of the spread code has elapsed, the cumulative addition at the memory 112 is stopped, and the processing indicated in FIG. 10 is repeated in one cycle unit (or in a plurality of cycle units).

In this manner, according to a synchronicity detection device of the present embodiment, a plurality of correlation values can be detected in a spread code cycle, and it is possible to improve the detection precision of synchronicity timing of a spread code to that extent. The maximum value of detected correlation energy is a value for which a plurality of detected values are cumulatively added, so synchronicity detection with an extremely high precision can be carried out. A shift register equipped with matched filters can be used with a small number of levels, so a simple configuration for synchronicity detection is possible. For a configuration where a replica code whose phase advances m chips at a time in the correlation coefficient generator generates, as mentioned above, after an initial value with a prescribed number of bits is given, generation can be made one after another based on data logically operated on from the initial value, and the configuration can be easily realized by merely preparing a memory means which stores the initial value and a circuit which logically operates on the initial value. If the spread code differs for each receiving base station, it is fine to store only the initial value of several bits of the spread code for each base station, and even if there are many receiving spread codes, it is possible to decrease the data stored.

As already mentioned above, a synchronicity detection device of the present embodiment operates to detect more accurate synchronicity timing from a synchronicity timing estimated within a certain range; it is fine to set the concrete number of m chips which is the range of a unit search according to the range of the estimated synchronicity timing.

Figure 11:
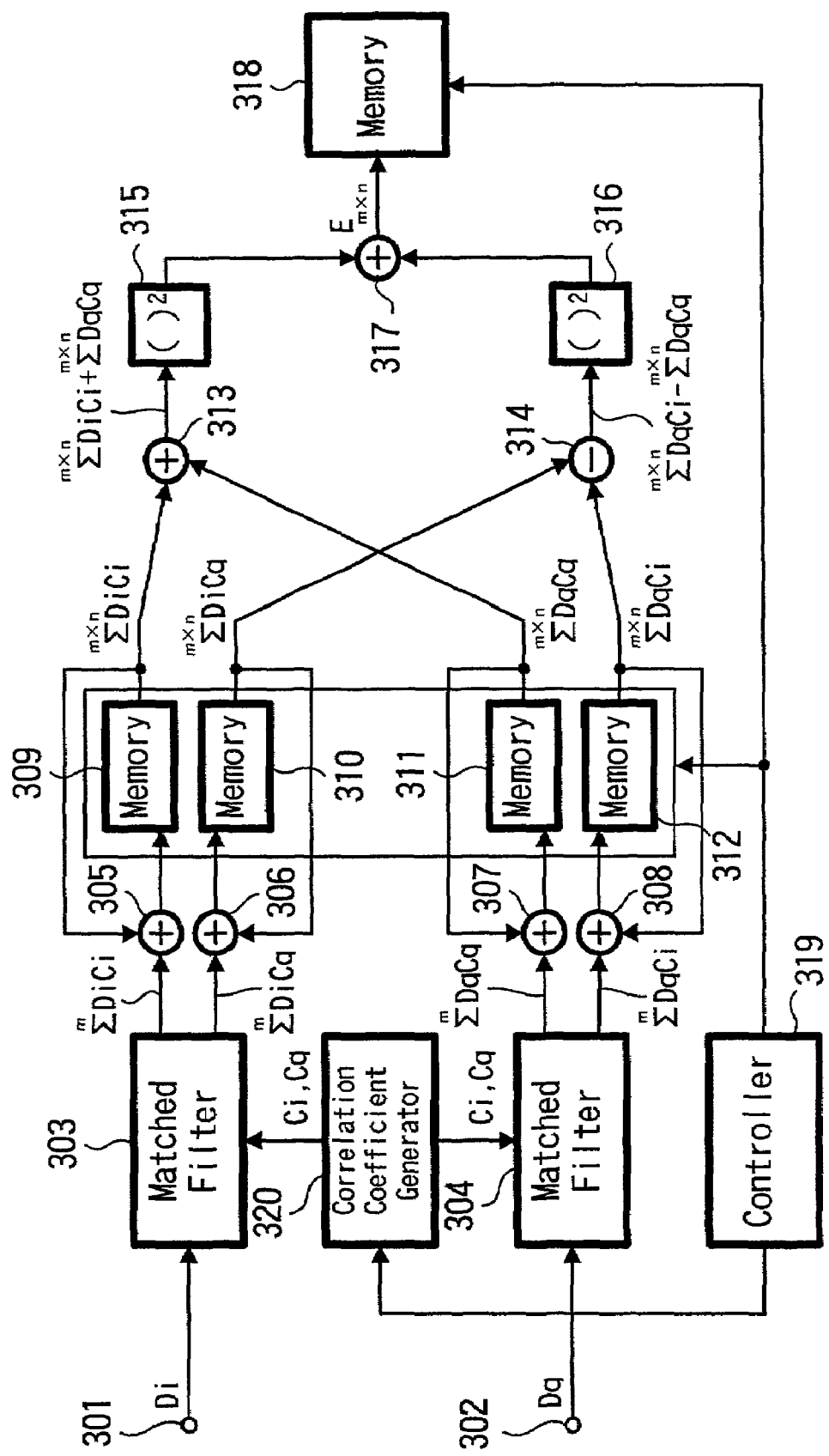
FIG. 11 is a block diagram indicating a configuration example of a synchronicity detection device according to a second embodiment of the present invention.

Next, a second embodiment of the present invention is described referring to FIG. 11.

The present embodiment is applied to a synchronicity detection device for receiving data wirelessly transmitted from a base station. A CDMA system in which data is diffused and transmitted by a prescribed spread code is applied to the wireless transmission system for performing wireless transmission between the base station and the reception terminal apparatus. Also in the present embodiment, a phase range of some extent of a spread code outputted from a base station (in other words, a range where a synchronicity timing exists) is estimated in separate processing.

FIG. 11 is a drawing indicating a configuration of a synchronicity detection device of the present embodiment. Data Di on a digitized in-phase component after detecting reception signals of a prescribed channel (frequency) is obtained at an input terminal 301, and data Dq having an orthogonal component of the same channel is obtained at the input terminal 302. The data Di and Dq are supplied to matched filters 303 and 304.

The matched filters 303 and 304 are circuits to detect correlations with CDMA type reception data diffused with a prescribed spread code; in-phase component and orthogonal component spread code replicas Ci and Cq supplied by a correlation coefficient generator 320 are supplied respectively to the matched filters 303 and 304. On the same principle of the matched filters described in the first embodiment mentioned above, detection of correlations between the reception data set to a shift register and the replica of the spread code supplied by the correlation coefficient generator is carried out.

When the spread code cycle is T, the cycle T is a larger value than the number of levels m equipped with the matched filters 303 and 304 of the present embodiment. The replicas Ci and Cq generated and supplied by the correlation coefficient generator 320 are caused to change in sequence as the m chip phase advances each time a clock generates m times (in other words, each m chips). In concrete terms, that processing is the same as with the correlation coefficient generator 130 already described in the first embodiment, and is configured, for example, as indicated in FIG. 5.

Then, a correlation value $\Sigma^m DiCi$ of the reception data Di and the replica code Ci, and a correlation value $\Sigma^m DiCq$ of the reception data Di and the replica code Cq are obtained with the matched filter 303. A correlation value $\Sigma^m DqCi$ of the reception data Dq and the replica code Ci and a correlation value $\Sigma^m DqCq$ of the reception data Dq and the replica code Cq are obtained with the matched filter 304.

The correlation value $\Sigma^m DiCi$ obtained with the matched filter 303 is supplied to a memory 309 via an adder 305 and is temporarily stored. The correlation value $\Sigma^m DiCq$ obtained with the matched filter 303 is supplied to a memory 310 via an adder 306 and is temporarily stored. The correlation value $\Sigma^m DqCq$ obtained with the matched filter 304 is supplied to a memory 311 via an adder 307 and is temporarily stored. The correlation value $\Sigma^m DqCi$ obtained with the matched filter 304 is supplied to a memory 312 via an adder 308 and is temporarily stored. It is fine for the memories 309 to 312 if one memory storage region is divided and operates as four memories.

The data temporarily stored in the memories 309 to 312 is read out with an m-chip delay. The data delayed and read out is returned to the adders 305 to 308 connected to the previous stage of the memories 309 to 312, and are cumulatively added.

Then, the cumulatively added value $\Sigma^{m*n} DiCi$ of the correlation value read from the memory 309 and the cumulatively added value $\Sigma^{m*n} DqCq$ of the correlation value read from the memory 311 are supplied to an adder 313, and an added value of both correlation values $\Sigma^{m*n} DiCi + \Sigma^{m*n} DqCq$) is obtained. This added value becomes an inverse diffusion output of the in-phase component. The inverse diffusion output is supplied to a squaring circuit 315 where it is made into a real number and supplied to an adder 317.

The cumulatively added value $\Sigma^{m*n} DiCq$ of the correlation value a read from the memory 310 and the cumulatively added value $\Sigma^{m*n} DqCi$ of the correlation value read from the memory 312 are supplied to a subtracter 314, and a subtracted value of both correlation values ($\Sigma^{m*n} DiCq - \Sigma^{m*n} DqCi$) is obtained. This subtracted value becomes an inverse diffused output of the orthogonal component. The inverse diffused output is supplied to a squaring circuit 316 where it is made into a real number and supplied to an adder 317.

At the adder 317, both supplied signals are added to make a single system signal, and a correlation energy Em*n is found. The correlation energy Em*n outputted by the adder 317 is supplied to a memory 318, and the value of the correlation energy for each timing is stored at a different address. A controller 319 which, for example, controls detection operations of the synchronicity detection device determines the local maximum value from the correlation energies stored in the memory 318, and the determined timing is set as the reference timing by which reception signals are processed. The control of the setting of the timing by which the spread code replica generates at the correlation coefficient generator 320 as well as of the reading and writing at the memories 309 to 312 is controlled by the controller 319.

With such a configuration, a synchronicity detection device of the present embodiment can perform prompt and favorable synchronicity detection with multiple times and correlations detected in a spread code cycle, similar to the case of the synchronicity detection device described in the first embodiment mentioned above. More specifically, in the case of the second embodiment, while the synchronicity detection state will be not described referring to a timing drawing, the basic operation is similar to that in the timing diagram in FIG. 10 described with the first embodiment, there are differences in whether a correlation energy found finally is cumulatively added and written to memory and whether a correlation energy is found after directly cumulatively adding an amplitude value outputted by a matched filter, and the timing and number of times synchronicity detection is carried out are the same.

In the case of the present embodiment, a correlation energy is calculated from an amplitude value which is the cumulative addition of matched filter outputs, and synchronicity detection with a higher precision can be carried out. In other words, while the synchronicity detection device in FIG. 4 described in the first embodiment is simpler as far as the configuration goes, with the synchronicity detection device indicated in FIG. 11 described in the second embodiment, cumulative addition occurs at the amplitude value stage before the calculation of the correlation energy, so it is possible to calculate a more accurate correlation energy, and it is possible to improve the detection precision.

In the embodiment mentioned above, a synchronicity detection device was used which was applied to a reception device which receives signals spread with a prescribed spread code using a CDMA technique in a cellular type wireless communication terminal, but it can also be applied to the detection of synchronic timing from signals spread similarly in another type of wireless system.

According to the present invention, detection of correlation values of replica codes and reception signals can be carried out each interval with a prescribed width in a spread code cycle, detection of a plurality of correlations is possible in a spread code cycle, and accurate synchronicity detection can be carried out in a cycle shorter than a spread code cycle with a simple configuration.

In this case, a memory means is equipped which stores correlation values detected with a matched filter which are cyclically added in a interval with a prescribed width, and correlation energy is detected from stored data in the storage means, so that correlation energy can be detected accurately using the storage means.

The output of the matched filter is delayed a prescribed time, an addition means is equipped which adds the output of the matched filter and the delayed signal, and the correlation value is detected from the signal calculated by the addition means, so the detection of more precise correlation values can be carried out.

The correlation coefficient generation means gives an initial value, is equipped with a pseudo-random series generation means which generates a pseudo-random series from that initial value, and supplies the pseudo-random series generated with the pseudo-random series generation means as a replica code, so replica code generation processing for synchronicity detection can be carried out easily.

The correlation coefficient generation means is equipped with a register which generates a prescribed pseudo-random series and an operation means which causes the pseudo-random series generated by the register to phase shift by a prescribed operation, and supplies the phase-shifted pseudo-random series outputted by the operation means and the pseudo-random series outputted by the register as a replica code, so it is possible to generate the pseudo-random series with many bits all at once, and the generation of replica codes with many bits for synchronicity detection can be carried out simply and promptly.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A synchronicity detection apparatus for detecting a timing of a spread code having a cycle length T, which is included in a reception signal, comprising:
    correlation coefficient generation means for dividing said spread code advancing a phase of said spread code every a certain first period, to generate a replica of said spread code;
    a matched filter which performs detection of correlation values of said replica code generated by said correlation coefficient generation means and said reception signal every a certain second period;
    a pseudo-random sequence generation means which generates a pseudo-random sequence from an initial value after supplying said pseudo-random sequence generated as said replica code;
    wherein said matched filter has m levels of shift register chips, T a larger value than the number of levels m,
    wherein the replicas generated by the correlation coefficient generator change in sequence each time m chips are advanced, the replicas inputted to the matched filter are updated by a value whose phase advances by m chips each time a searchable range of m chips per certain first period advances;
    wherein said synchronicity detection apparatus detects a local maximum correlation value over the searchable range equal to said m shift registers; the searchable range being repeated plural times over the length T of the spread code.

2. The synchronicity detection apparatus according to claim 1, further comprising:
    adding means which delays an output of the said matched filter by said certain first period to generate a delayed signal, and adds said delayed signal and the said output of said matched filter, and
    means for detecting a correlation value from the signal added by said adding means.

3. The synchronicity detection apparatus according to claim 1, wherein said correlation coefficient generation means comprises:
    a register which generates a certain pseudo-random sequence;
    operation means which phase shifts a phase of said pseudo-random sequence generated by said register, and
    means for supplying said phase-shifted pseudo-random sequence outputted by said operation means and said pseudo-random sequence outputted by said aforementioned register as said replica code.

4. The synchronicity detection apparatus according to claim 1, wherein said correlation coefficient generation means comprises replica code generation means for generating one unit of a second replica code from one unit of a first inputted replica code and generates one unit of a next replica code using one unit of said second replica code.

5. The synchronicity detection apparatus according to claim 1, wherein one unit of said spread code is each generated by repeating latch operations each time an operation clock of said correlation coefficient generation means is supplied predetermined number of times.

6. A method for detecting a timing of a spread code having a cycle length T, which is included in a reception signal, comprising:
    dividing the spread code advancing a phase of said spread code every a certain first period, to generate a replica of the spread code;
    detecting with a matched filter correlation values of the replica code and the reception signal every a certain second period;
    generating a pseudo-random sequence from an initial value after supplying the pseudo-random sequence generated as the replica code;
    wherein the matched filter has m levels of shift register chips, T a larger value than the number of levels m,
    wherein the replicas change in sequence each time m chips are advanced, the replicas inputted to the matched filter are updated by a value whose phase advances by m chips each time a searchable range of m chips per certain first period advances, and
    detecting a local maximum correlation value over the searchable range, the searchable range being repeated plural times over the length T of the spread code.

* * * * *